Feb. 10, 1931.  L. B. SMITH  1,791,847
CASING FOR FLEXIBLE DRIVE SHAFTS
Filed May 12, 1928  2 Sheets-Sheet 1
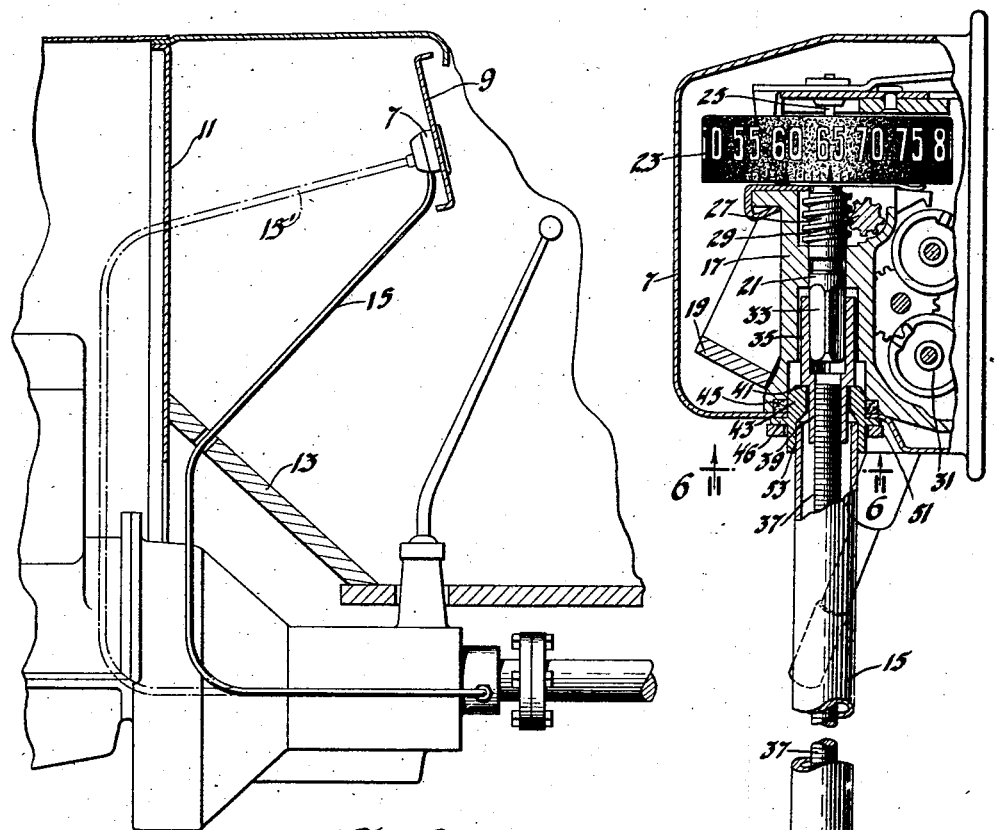

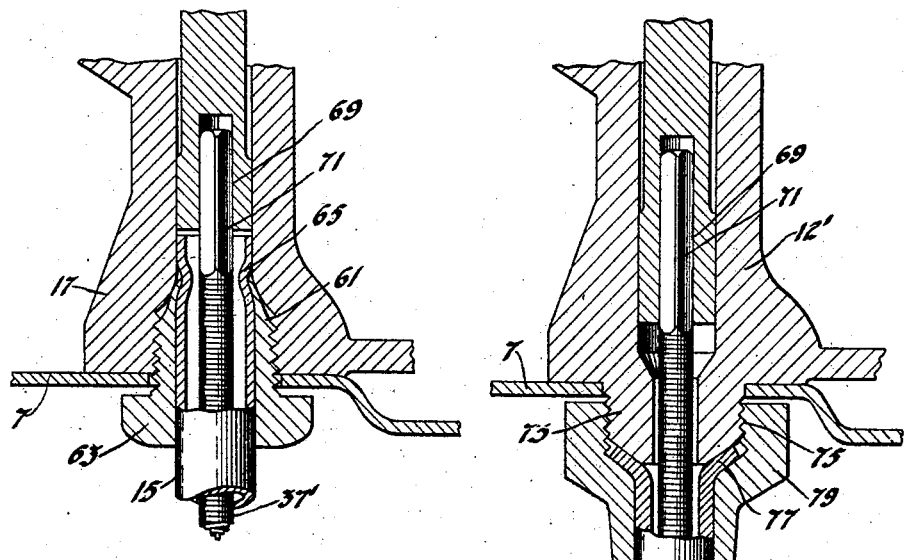
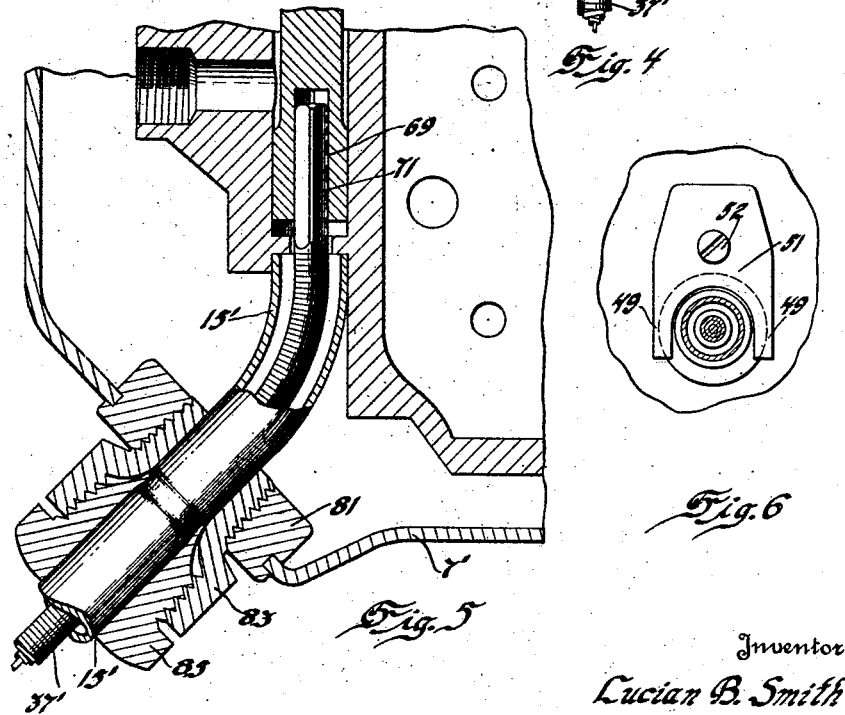

Patented Feb. 10, 1931

1,791,847

UNITED STATES PATENT OFFICE

LUCIAN B. SMITH, OF FLINT, MICHIGAN, ASSIGNOR TO A C SPARK PLUG COMPANY, OF FLINT, MICHIGAN, A COMPANY OF MICHIGAN

CASING FOR FLEXIBLE DRIVE SHAFTS

Application filed May 12, 1928. Serial No. 277,379.

This invention relates to power transmitting means and particularly to novelty in a shaft casing used in connection with the flexible drive shaft between the power take off and the measuring instrument on the instrument board of a motor vehicle.

Speedometers on the instrument board of automobiles were once quite commonly driven from a front wheel, necessitating a flexible shaft casing to accommodate steering movements of the wheels. The drive for such instruments is now generally taken from the rear of the change speed transmission, between which point and the instrument board there is little or no relative movement. The need for the flexible shaft casing under these conditions no longer exists.

It is, therefore, an object of the invention to use a rigid, non-flexible, casing and thereby take advantage of economy in manufacture in place of the generally used flexible casing.

It is also an object of the invention to make use of a casing which is capable of being conveniently secured to the parts with which it is associated by any one of several securing means. Other objects and advantages of the structure herein described will be understood from the following description and the accompanying drawing.

In the drawing:

Figure 1 is a view of a power take off and a speedometer, together with the connected drive shaft, the take off and the speedometer being shown in section.

Figure 2 is a longitudinal vertical section showing the organization of Figure 1 as applied to a motor vehicle.

Figure 3 shows a modified form of attachment by which the rigid tube may be secured to the instrument, the view being in vertical section substantially like that in Figure 1.

Figure 4 shows in vertical section still another modified form by which the parts may be assembled.

Figure 5 is a vertical sectional view of a modified form, one where an angular relation exists between the entering driving shaft and the rotor shaft of the instrument.

Figure 6 is a detail of a part shown in Figure 1. This view is taken on line 6—6 of Figure 1.

Referring by reference characters to the drawing and first to Figures 1, 2 and 6, numeral 7 represents an instrument casing, in the present instance the casing of a speedometer used on a motor vehicle to measure the rate of rotation of the propeller shaft and of the rate of travel of the vehicle. Such an instrument is commonly carried by an instrument board, the board being represented by numeral 9 on Figure 2. Forwardly of the instrument board there is a dash 11 and below the board is a floor board 13. In Figure 2, the instrument within the casing 7 is shown as being driven by a shaft housed within a casing. The full line 15 represents the shaft casing extending downwardly from the instrument, downwardly and forwardly to and through the floor board 13, and then rearwardly to the rear of the transmission housing. Numeral 15' represents by dotted lines a position which the drive shaft and its casing may take, if preferred. In this dotted line arrangement, the shaft extends forwardly from the instrument through the dash 11 and then downwardly and rearwardly to the rear end of the transmission housing.

The invention is not concerned with any specific measuring instrument and the speedometer is not, for that reason, fully illustrated or described. There is shown a frame 17, a magnet 19, a rotor shaft 21, and a speed cup 23 carried by a spindle 25. These parts are concerned with the speed registering mechanism. The rotor shaft also has a gear member 27 which drives through a gear 29 the odometer wheels 31 by which the distance travelled by the vehicle is registered. As is well known, the rotation of the rotor shaft through the gear elements 27 and 29 operates the number wheels of the odometer. The rotation of the shaft 21 effects rotation of a rotor within the speed cup 23, the effect of which is to produce a magnetic drag upon the speed cup to indicate by the extent of its rotation the speed of the vehicle.

The rotor shaft 21 has at its lower end a non-circular tip 33 for engagement within a non-circular opening in a driving tip 35. Within the tubular shaft casing is a flexible drive shaft 37. The driving tip 35 is sleeved at its end remote from the non-circular end and is staked to the shaft 37 as at 39. The tip 35 is at mid length formed externally with a shoulder 41 which rests on a ferrule 43. The ferrule 43 enters an opening in casing 7 and an opening in frame 17. Between the frame and casing, and also in contact with the ferrule 43, is a washer of felt or the like 45. The ferrule has a flange 46 outside the casing and engaging the flange are the furcations 49 of a clamp 51. A screw or the like 52 is used to attach the clamp 51 to the frame, a screw passing through an opening in casing 7. The end of shaft casing 15 enters the open end of the ferrule and is staked thereto as at 53. By the means described a coupling between the flexible shaft and the instrument is secured which is efficient and requires no attention, which is easy of assembly and which may be readily disconnected.

The flexible shaft in common use is usually housed in a flexible casing. This arrangement was once necessary, in the days when the drive for the instrument was taken from the front wheel, the front wheel being mounted to swivel relative to the front axle. In the arrangement more commonly used at the present time, the drive is taken from the rear end of the transmission housing which has but little, if any, movement relative to the instrument panel. While, therefore, it is necessary that there be one or more bends in the casing carrying the flexible drive shaft, it is not necessary that the casing be itself flexible for continual bending. A plain tube of copper, steel or similar metal is substituted for the more commonly used flexible shaft casing. Such a tube is suitably bent before assembly to the required shape so that its ends may be in proper position for attachment to the gear housing at the transmission end and to the instrument. Such a tube is more economical to manufacture than the usual flexible tubing and is equally useful. It is also well adapted to a great variety of couplings, some of which are illustrated.

The couplings shown in Figure 1, whereby the shaft 37 is connected in driving relation to the rotor shaft and whereby the casing 15 is connected to the instrument frame, have been described.

In Figure 3 is shown a modified form wherein the well-known "Dole" fitting is used. In this case, the instrument casing is represented by numeral 7 and the instrument frame by numeral 17, as before. The frame opening is threaded as at 61. The "Dole" threaded nut 63, normally loosely mounted on tube 15, is screwed into the threaded part 61 and clamps the tube 15 as shown at 65. In this case, the rotor shaft has a non-circular open end 69 to receive a non-circular tip 71 formed at the end of a flexible drive shaft 37'. The plain tube 15 is well adapted for this type of coupling.

In Figure 4 is shown another type of coupling between the instrument and the flexible drive shaft and its casing. In this case, the frame member 12' differs slightly from the frame member 17. It has an extension 73 projecting through the casing 7. The projection is externally threaded as at 75. The tube 15 has its end flared out as at 77 within a nut 79. The inner face of the nut and the end of the extension 73 are shaped to clamp the flared end of the tube when the nut is threaded up on the extension 73.

In some installations, the drive shaft enters the instrument casing at an angle to the rotor shaft. The rigid casing for the drive shaft, as disclosed in this application, is well adapted for use in this connection.

In Figure 5, the co-operating adjacent ends of the rotor shaft and the driving shaft, 69 and 71 respectively, are like the corresponding parts shown in Figure 3. Shaft 37' and the casing 15' enter at an angle to the rotor shaft. In this case, it is found convenient to extend the drive shaft casing 15' into the casing 7' and bend it to the required angle, as shown in the figure. To secure the casing 15', the casing 7' is provided with a nut member 81 internally threaded to engage the external threads of a fitting 83 which co-operates with a nut 85 in a well-known manner to clamp the tube 15'.

The connection of the driving shaft and the bent shaft housing with the take off mechanism may be made in various ways. One convenient structural arrangement is that shown in Figure 1. In this figure, 91 is the transmission shaft, numeral 93 represents a gear case to house the connection between the shaft 91 and the flexible shaft 37. The gear case has a shaft bearing at 95. A plug 97 is threaded into the gear case and has a bearing opening 96 in alignment with bearing 95. In said bearings is a shaft 99 positioned transversely relative to transmission shaft 91 and having a gear 101 in driving engagement with a gear on the transmission shaft. Shaft 99 has a slot 103 to receive a lug 105 carried by a driving tip 107. The tip, at its other end, is staked to the flexible cable 37 as at 109. Between its ends it has a washer 111. The tubular casing 15 is swedged at its end to receive a nut 113 and which nut, when threaded on the end of the plug 97, clamps the tube 15 to the plug. The tube near its end is shaped as at 115 to provide a bearing for the washer 111.

It will be appreciated that by the construction shown and described it is possible to use a plain tube of copper, steel or the like, in those instances where the speedometer is driven from a moving part which is carried by a vehicle member having little, if any, movement relative to the instrument carrying member. Such use of a plain tube instead of the more commonly used flexible tube effects economy in manufacture and such a tube is adaptable to a great variety of attaching means, as explained above.

I claim:

In a measuring instrument having a rotor shaft and an enclosing casing, a flexible driving shaft extending into the casing and in driving relation to said rotor shaft, a rigid tubular housing enclosing said flexible shaft and extending into the casing, the casing wall through which the driving shaft passes being in angular relation to the axis of the rotor shaft and said rigid housing for the flexible shaft within the casing being provided with a bend to accommodate the aforesaid angular relation of the parts.

In testimony whereof I affix my signature.

LUCIAN B. SMITH.